US012341733B2

(12) United States Patent
Fields et al.

(10) Patent No.: US 12,341,733 B2
(45) Date of Patent: Jun. 24, 2025

(54) AI/ML CHATBOT FOR NEGOTIATIONS

(71) Applicant: STATE FARM MUTUAL AUTOMOBILE INSURANCE COMPANY, Bloomington, IL (US)

(72) Inventors: Brian Mark Fields, Phoenix, AZ (US); Nathan L. Tofte, Downs, IL (US); Joseph Robert Brannan, Bloomington, IL (US); Vicki King, Bloomington, IL (US); Justin Davis, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 18/378,329

(22) Filed: Oct. 10, 2023

(65) Prior Publication Data

US 2024/0291778 A1  Aug. 29, 2024

Related U.S. Application Data

(60) Provisional application No. 63/466,525, filed on May 15, 2023, provisional application No. 63/460,753, (Continued)

(51) Int. Cl.
*H04L 51/02* (2022.01)
*G06Q 50/18* (2012.01)

(52) U.S. Cl.
CPC ........... *H04L 51/02* (2013.01); *G06Q 50/188* (2013.01)

(58) Field of Classification Search
CPC ............... H04L 51/02; G06Q 50/188
(Continued)

(56) References Cited

U.S. PATENT DOCUMENTS 7,523,060 B1 * 4/2009 Tenorio ................ G06Q 40/00
705/37
10,409,995 B1   9/2019 Wasiq et al.
(Continued)

FOREIGN PATENT DOCUMENTS

CN   114742657 A   7/2022
KR   10-2619905 B1   1/2024
WO   2024/112887 A1   5/2024

OTHER PUBLICATIONS

Unknown, "GPT-3 vs GPT-4 | What's the difference?", Jan. 2023, botpress.com, web.archive.org/web/20230131033431/https://botpress.com/blog/gpt-3-vs-gpt-4-whats-the-difference (Year: 2023).*
(Continued)

*Primary Examiner* — Ruolei Zong
(74) *Attorney, Agent, or Firm* — MARSHALL, GERSTEIN & BORUN LLP

(57) ABSTRACT

Systems and methods for an artificial intelligence (AI)/machine learning (ML) chatbot for intelligent negotiation of terms is disclosed herein. An exemplary computing system includes one or more processors; and a memory storing executable instructions thereon. When executed by the one or more processors, these instructions may cause the one or more processors to: receive, from a first contracting party during a negotiating period, a plurality of prospective terms for a contractual agreement; and determine, via an AI chatbot, whether the plurality of prospective terms are acceptable terms based on a plurality of parameters indicated by a second contracting party. Responsive to determining that the plurality of prospective terms are unacceptable terms, the instructions may further cause the processors to generate, via the AI chatbot, a plurality of counter terms based on the plurality of parameters; and transmit the plurality of counter terms to the first contracting party.

20 Claims, 4 Drawing Sheets

Related U.S. Application Data filed on Apr. 20, 2023, provisional application No. 63/486,515, filed on Feb. 23, 2023.

(58) Field of Classification Search
USPC .......................................................... 709/206
See application file for complete search history.

(56) References Cited

U.S. PATENT DOCUMENTS

| | | | |
|---|---|---|---|
| 11,017,466 | B1 | 5/2021 | Cunningham et al. |
| 11,270,331 | B1 | 3/2022 | Breitweiser et al. |
| 11,444,893 | B1 | 9/2022 | Kalluri |
| 11,593,685 | B1 * | 2/2023 | Chan ..................... G06N 5/025 |
| 11,900,451 | B1 | 2/2024 | King et al. |
| 2008/0196099 | A1 | 8/2008 | Shastri |
| 2015/0128246 | A1 | 5/2015 | Feghali et al. |
| 2016/0379284 | A1 | 12/2016 | Alizadeh et al. |
| 2018/0253780 | A1 | 9/2018 | Wang et al. |
| 2020/0327172 | A1 * | 10/2020 | Coquard ............ G06F 16/9035 |
| 2020/0372823 | A1 | 11/2020 | Edwards et al. |
| 2021/0081819 | A1 | 3/2021 | Polleri et al. |
| 2021/0342946 | A1 * | 11/2021 | Leise ................. G06Q 20/4015 |
| 2022/0129261 | A1 | 4/2022 | Cabrera et al. |
| 2022/0138161 | A1 * | 5/2022 | Anjum .................. G06F 40/197 715/272 |
| 2022/0138690 | A1 * | 5/2022 | Anjum .................. G06F 40/131 705/80 |
| 2022/0229860 | A1 * | 7/2022 | Ship ...................... G06F 3/0486 |
| 2022/0229978 | A1 * | 7/2022 | Ship ........................ G06F 40/40 |
| 2022/0261711 | A1 * | 8/2022 | Krishna ............... G06Q 50/188 |
| 2022/0270120 | A1 | 8/2022 | King |
| 2023/0135162 | A1 | 5/2023 | Cohen et al. |
| 2024/0144372 | A1 | 5/2024 | Wu et al. |
| 2024/0194180 | A1 * | 6/2024 | Goldshtein ............. H04L 51/02 |
| 2024/0281677 | A1 | 8/2024 | Mifflin |
| 2024/0281706 | A1 | 8/2024 | Marzinzik et al. |
| 2024/0283697 | A1 | 8/2024 | Bates-Maricle |
| 2024/0289113 | A1 | 8/2024 | Bates-Maricle |
| 2024/0289872 | A1 | 8/2024 | Fields et al. |
| 2024/0291785 | A1 | 8/2024 | Fields et al. |
| 2024/0296489 | A1 | 9/2024 | Brannan |
| 2024/0330151 | A1 | 10/2024 | Williams et al. |
| 2024/0330455 | A1 | 10/2024 | Sahu |
| 2024/0330504 | A1 | 10/2024 | Williams et al. |
| 2024/0330654 | A1 | 10/2024 | Williams et al. |
| 2024/0331043 | A1 | 10/2024 | Williams et al. |
| 2024/0333728 | A1 | 10/2024 | Williams et al. |
| 2024/0333746 | A1 | 10/2024 | Williams et al. |
| 2024/0394503 | A1 | 11/2024 | Gutierrez et al. |
| 2024/0394593 | A1 | 11/2024 | Gutierrez et al. |
| 2024/0412145 | A1 | 12/2024 | Wheeler et al. |
| 2024/0412313 | A1 | 12/2024 | Wheeler et al. |
| 2024/0428259 | A1 | 12/2024 | Wheeler et al. |
| 2025/0022071 | A1 | 1/2025 | Gutierrez et al. |
| 2025/0029192 | A1 | 1/2025 | Wheeler et al. |

OTHER PUBLICATIONS

Anonymous, Roots Automation Introduces InsurGPT—the World's Most Advanced Generative AI Model for Insurance. Retrieved from the Internet at: https://ffnews.com/newsarticle/roots-automation-introduces-insurgpt-the-worlds-most-advanced-generative-ai-model-for-insurance/ (published May 15, 2023).

Introducing Agent M—a powerful Large Language model or ChatGPT based Master Agent developer framework, powered by Floatbot platform, that lets you create multiple application-specific LLM-based Agent(s). Retrieved from the internet at: <URL:https://www.linkedin.com/posts/jimmypadia_nyse-floor-talk-floatbot-activity-7089664064603234304-60TU?utm_source=share&utm_medium=member_android> (2023).

Isenberg, The Compliance Tasks ChatGPT Can (and Can't) Handle, Ignites (published Apr. 3, 2023).

Morelli, Will ChatGPT, artificial intelligence replace financial professionals any time soon?, Insurance NewsNet. Retrieved from the Internet at: <https://insurancenewsnet.com/innarticle/will-chatgpt-artificial-intelligence-replace-financial-professionals-any-time-soon> (published Jan. 23, 2023).

Morris, Morgan Stanley Developing Chatbot with OpenAI, Ignites (published Mar. 15, 2023).

Munk, Will AI models like ChatGPT take your insurance job?, Life Annuity Speciality (published Mar. 7, 2023).

Rengachary et al., ChatGPT: A Conversation About Underwriting and Life Insurance. Retrieved from the internet at: https://www.coverager.com/chatgpt-a-conversation-about-underwriting-and-life-insurance/ (published Apr. 3, 2023).

Smith, Insurer Zurich experiments with ChatGPT for claims and data mining, Financial Times (published Mar. 24, 2023).

Tuohy, What ChatGPT's Chores May Look Like in Life Insurance Industry, Life Annuity Specialist (published Apr. 21, 2023).

Wilson, Should Financial Services Companies Consider Open AI?, LIMRA.com MarketFacts (published Mar. 2023).

Dickson, How to create a private ChatGPT that interacts with your local documents, TechTalks. Retrieved from the Internet at: <URL:https://bdtechtalks.com/2023/06/01/create-privategpt-local-llm/> (Jun. 2023).

OpenPR Worldwide Public Relations, Press release, "Floatbot.AI Unveils Revolutionary Agent M—Generative AI (LLM or ChatGPT) Based Master Agent developer framework," Web page downloaded from Internet at <https://www.openpr.com/news/3147235/floatbot-ai-unveils-revolutionary-agent-m-generative-ai-llm>. Retrieved from Internet on Aug. 1, 2023.

\* cited by examiner

300

302
Receive, from a first contracting party during a negotiating period, a plurality of prospective terms for a contractual agreement.

304
Determine, via an AI chatbot, whether the plurality of prospective terms are acceptable terms based on a plurality of parameters indicated by a second contracting party.

306
Responsive to determining that the plurality of prospective terms are unacceptable terms, generate, via the AI chatbot, a plurality of counter terms based on the plurality of parameters.

308
Transmit the plurality of counter terms to the first contracting party.

FIG. 3

AI/ML CHATBOT FOR NEGOTIATIONS

CROSS-REFERENCE TO RELATED APPLICATIONS

This application claims priority to and the benefit of the filing date of provisional U.S. Patent Application No. 63/466,525 entitled "AI/ML CHATBOT FOR NEGOTIATIONS," filed on May 15, 2023, provisional U.S. Patent Application No. 63/460,753 entitled "AI/ML CHATBOT FOR NEGOTIATIONS," filed on Apr. 20, 2023, and provisional U.S. Patent Application No. 63/486,515 entitled "CHATBOT FOR NEGOTIATIONS," filed on Feb. 23, 2023, the entire contents of each of which are hereby expressly incorporated herein by reference.

FIELD OF THE INVENTION

The present disclosure generally relates to intelligent negotiation of terms for a contractual agreement, and more particularly, negotiating prospective terms for a contractual agreement via an artificial intelligence (AI) chatbot.

BACKGROUND

Generally speaking, negotiations may involve an exchange of prospective terms between two parties until a set of terms acceptable to both parties is finalized by a contractual agreement or the negotiation is abandoned by one or both parties. In conventional negotiations, parties may be responsible for independently determining and proposing prospective terms according to each respective party's priorities (e.g., cost of product, date of receiving product, delivery method or cost for product) based on a wide variety of parameters (e.g., condition of product, how similar product is to desired product, urgency of obtaining product). Accordingly, conventional negotiations may typically be intricate and time consuming.

However, conventional negotiations may also suffer from numerous other drawbacks. For example, these intricacies associated with conventional negotiations may be further complicated by parties relying on irrational/emotional considerations outside of the party's priorities and/or defined parameters, thereby preventing an unbiased interpretation of prospective terms. Negotiating parties may also conventionally struggle to accurately interpret and/or respond to various negotiation styles (e.g., aggressive, collaborative, congenial, amenable), which may influence how prospective terms are determined or exchanged. Further, parties may be generally limited in the number of negotiations they are able to simultaneously perform using conventional techniques. Conventional techniques may include additional inefficiencies, ineffectiveness, encumbrances, and/or other drawbacks as well.

Accordingly, a need exists for an AI/machine learning (ML) chatbot configured to negotiate terms for a contractual agreement to provide users/operators with accurate, relevant terms and term interpretations that may mitigate the negative effects stemming from a lack of such nuanced, readily available information.

SUMMARY

The present embodiments may relate to, inter alia, systems and methods for intelligent negotiation of terms for a contractual agreement via a ML and/or an AI chatbot (or voice bot).

In one aspect, a computer system for intelligent negotiation of terms by an AI chatbot is disclosed herein. The computer system may include one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice or chat bots, ChatGPT bots, and/or other electronic or electrical components, which may be in wired or wireless communication with one another. In one instance, the computer system may comprise one or more processors and a memory storing executable instructions thereon that, when executed by the one or more processors, cause the one or more processors to: (1) receive, from a first contracting party during a negotiating period, a plurality of prospective terms for a contractual agreement, (2) determine, via the AI chatbot, whether the plurality of prospective terms are acceptable terms based on a plurality of parameters indicated by a second contracting party, (3) responsive to determining that the plurality of prospective terms are unacceptable terms, generate, via the AI chatbot, a plurality of counter terms based on the plurality of parameters, and/or (4) transmit the plurality of counter terms to the first contracting party. The computer system may include additional, less, or alternate functionality, including that discussed elsewhere herein.

In another aspect, a computer-implemented method for intelligent negotiation of terms by an AI chatbot is disclosed herein. The computer-implemented method may be implemented via one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice or chat bots, ChatGPT bots, and/or other electronic or electrical components, which may be in wired or wireless communication with one another. In one instance, the computer-implemented method may include: (1) receiving, from a first contracting party during a negotiating period, a plurality of prospective terms for a contractual agreement, (2) determining, via the AI chatbot, whether the plurality of prospective terms are acceptable terms based on a plurality of parameters indicated by a second contracting party, (3) responsive to determining that the plurality of prospective terms are unacceptable terms, generating, via the AI chatbot, a plurality of counter terms based on the plurality of parameters, and/or (4) transmitting the plurality of counter terms to the first contracting party. The computer-implemented method may include additional, less, or alternate functionality or actions, including those discussed elsewhere herein.

In another aspect, a non-transitory computer-readable medium storing non-transitory computer readable instructions stored thereon for intelligent negotiation of terms by an AI chatbot is disclosed herein. The instructions, when executed on one or more processors, may cause the one or more processors to: (1) receive, from a first contracting party during a negotiating period, a plurality of prospective terms for a contractual agreement; (2) determine, via the AI chatbot, whether the plurality of prospective terms are acceptable terms based on a plurality of parameters indicated by a second contracting party; (3) responsive to determining that the plurality of prospective terms are unacceptable terms, generate, via the AI chatbot, a plurality of counter terms based on the plurality of parameters; and/or (4) transmit the plurality of counter terms to the first contracting party. The instructions may direct additional, less, or alternate functionality, including that discussed elsewhere herein.

In another aspect, a computer system for intelligent negotiation of terms by ML chatbot is disclosed herein. The computer system may include one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice or chat bots, ChatGPT bots, and/or other electronic or electrical components, which may be in wired or wireless communication with one another. In one instance, the computer system may comprise one or more processors and a memory storing executable instructions thereon that, when executed by the one or more processors, cause the one or more processors to: (1) receive, from a first contracting party device during a negotiating period, a plurality of prospective terms for a contractual agreement, (2) determine, via the ML chatbot, whether the plurality of prospective terms are acceptable terms based on a plurality of parameters indicated by a second contracting party device, (3) responsive to determining that the plurality of prospective terms are unacceptable terms, generate, via the ML chatbot, a plurality of counter terms based on the plurality of parameters, and/or (4) transmit the plurality of counter terms to the first contracting party device. The computer system may include additional, less, or alternate functionality, including that discussed elsewhere herein.

In another aspect, a computer system for intelligent negotiation of terms by an AI chatbot is disclosed herein. The computer system may include one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice or chat bots, ChatGPT bots, and/or other electronic or electrical components, which may be in wired or wireless communication with one another. In one instance, the computer system may comprise one or more processors and a memory storing executable instructions thereon that, when executed by the one or more processors, cause the one or more processors to: (1) receive, from a first contracting party device during a negotiating period, a plurality of prospective terms for a contractual agreement, (2) determine, via the AI chatbot, whether the plurality of prospective terms are acceptable terms based upon a plurality of parameters indicated by a second contracting party device, (3) responsive to determining that the plurality of prospective terms are unacceptable terms, generate, via the AI chatbot, a plurality of counter terms based upon the plurality of parameters, and/or (4) transmit the plurality of counter terms to the first contracting party device. The computer system may include additional, less, or alternate functionality, including that discussed elsewhere herein.

In another aspect, a computer system for intelligent negotiation of terms by an AI chatbot is disclosed herein. The computer system may include one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice or chat bots, ChatGPT bots, and/or other electronic or electrical components, which may be in wired or wireless communication with one another. In one instance, the computer system may comprise one or more processors and a memory storing executable instructions thereon that, when executed by the one or more processors, cause the one or more processors to: (1) receive, from a first contracting party device (such as a mobile device, computing device, wearable, virtual reality headset, augmented reality glasses, voice or chat bot, or AI or ML chat bot) during a negotiating period, a plurality of prospective terms for a contractual agreement, (2) determine, via the AI chatbot, whether the plurality of prospective terms are acceptable terms based upon a plurality of parameters indicated by a second contracting party device (such as a mobile device, computing device, wearable, virtual reality headset, augmented reality glasses, voice or chat bot, or AI or ML chat bot), (3) responsive to determining that the plurality of prospective terms are unacceptable terms, generate, via the AI chatbot, a plurality of counter terms based upon the plurality of parameters, and/or (4) transmit and present the plurality of counter terms to the first contracting party device (such as present the counter terms via a voice or chat bot or a display screen). The computer system may include additional, less, or alternate functionality, including that discussed elsewhere herein.

In another aspect, a computer system for intelligent negotiation of terms by a ML chatbot is disclosed herein. The computer system may include one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice or chat bots, ChatGPT bots, and/or other electronic or electrical components, which may be in wired or wireless communication with one another. In one instance, the computer system may comprise one or more processors and a memory storing executable instructions thereon that, when executed by the one or more processors, cause the one or more processors to: (1) receive, from a first contracting party device (such as a mobile device, computing device, wearable, virtual reality headset, augmented reality glasses, voice or chat bot, or AI or ML chat bot) during a negotiating period, a plurality of prospective terms for a contractual agreement, (2) determine, via the ML chatbot, whether the plurality of prospective terms are acceptable terms based upon a plurality of parameters indicated by a second contracting party device (such as a mobile device, computing device, wearable, virtual reality headset, augmented reality glasses, voice or chat bot, or AI or ML chat bot), (3) responsive to determining that the plurality of prospective terms are unacceptable terms, generate, via the ML chatbot, a plurality of counter terms based upon the plurality of parameters, and/or (4) transmit and present the plurality of counter terms to the first contracting party device (such as present the counter terms via a voice or chat bot or a display screen). The computer system may include additional, less, or alternate functionality, including that discussed elsewhere herein.

Additional, alternate and/or fewer actions, steps, features and/or functionality may be included in some aspects and/or embodiments, including those described elsewhere herein.

In accordance with the above, and with the disclosure herein, the present disclosure includes improvements in computer functionality or in improvements to other technologies at least because the disclosure describes that, e.g., a hosting server (e.g., central server), or otherwise computing device (e.g., a user computing device), is improved where the intelligence or predictive ability of the hosting server or computing device is enhanced by a trained machine learning chatbot/voice bot. This model, executing on the hosting server or user computing device, is able to accurately and efficiently negotiate with parties on another party's behalf. That is, the present disclosure describes improvements in the functioning of the computer itself or "any other technology or technical field" because a hosting server or user computing device, is enhanced with a trained machine learning chatbot/voice bot to accurately determine one or more products desired by a party, determine parties corresponding to the product, determine/generate terms (e.g., acceptable terms, prospective terms, counter terms) acceptable to the party, and finalize a contractual agreement between parties for agreed upon terms. This improves over the prior art at least because existing systems lack such independent and/or predictive functionality, and are generally unable to accurately determine products desired by a party, determine parties corresponding to the product, determine/generate terms acceptable to the party, finalize contractual agreements, and/or otherwise successfully negotiate with party/parties for product(s) on another party's behalf.

As mentioned, the model(s) may be trained using machine learning and may utilize machine learning during operation. Therefore, in these instances, the techniques of the present disclosure may further include improvements in computer functionality or in improvements to other technologies at least because the disclosure describes such models being trained with a plurality of training data (e.g., example inputs and associated example outputs, response signals, parameters, acceptable terms, prospective terms, counter terms, products, etc.) to output the system-specific conditions configured to negotiate with party/parties for product(s) on another party's behalf . . . .

Moreover, the present disclosure includes effecting a transformation or reduction of a particular article to a different state or thing, e.g., transforming or reducing the negotiation with party/parties for product(s) on another party's behalf from a non-optimal or error state to an optimal state.

Still further, the present disclosure includes specific features other than what is well-understood, routine, conventional activity in the field, or adding unconventional steps that demonstrate, in various embodiments, particular useful applications, e.g., receiving, from a first contracting party during a negotiating period, a plurality of prospective terms for a contractual agreement; determining, via an AI chatbot, whether the plurality of prospective terms are acceptable terms based on a plurality of parameters indicated by a second contracting party; responsive to determining that the plurality of prospective terms are unacceptable terms, generating, via an AI chatbot, a plurality of counter terms based on the plurality of parameters; and transmitting the plurality of counter terms to the first contracting party.

BRIEF DESCRIPTION OF THE DRAWINGS

The figures described below depict various aspects of the applications, methods, and systems disclosed herein. It should be understood that each figure depicts one embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

FIG. 3 depicts a flow diagram representing an exemplary computer-implemented method for AI/ML chatbot for negotiations.

Figure 1:
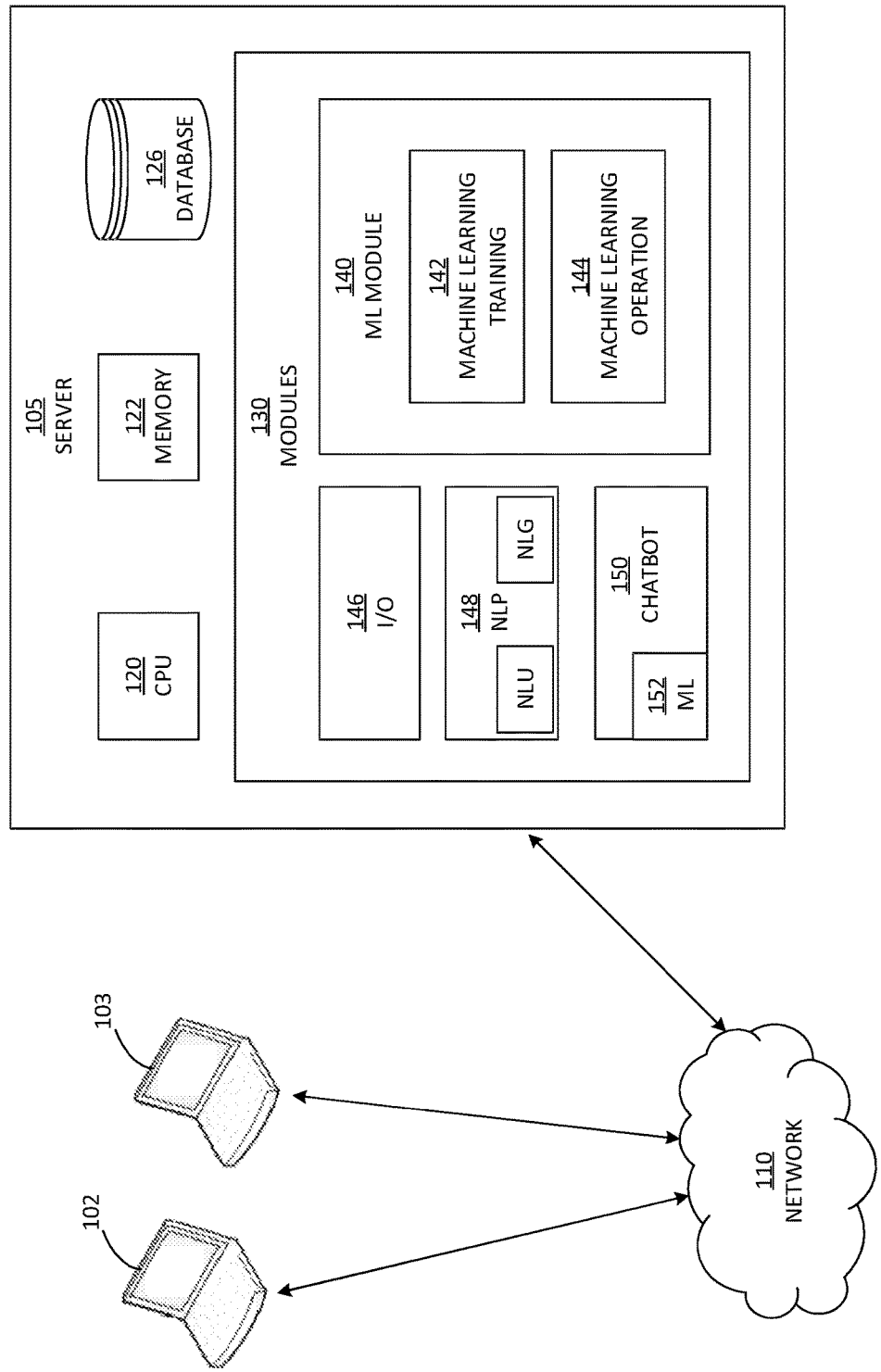
FIG. 1 depicts a block diagram of an exemplary computer system in which methods and systems for intelligent negotiation via an AI chatbot are implemented.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

DETAILED DESCRIPTION

Overview

The computer systems and methods disclosed herein generally relate to, inter alia, methods and systems for intelligent negotiation of terms for a contractual agreement via an AI and/or ML chatbot.

Some embodiments may use techniques to receive prospective terms from a first contracting party during a negotiating period, determine, via an AI and/or ML chatbot (hereinafter AI chatbot), whether the prospective terms are acceptable terms to a second contracting party, generate, via the AI chatbot, counter terms, and transmit the counter terms to the first contracting party on behalf of the second contracting party. The AI chatbot may further: (i) determine a product desired by the second contracting party; (ii) initiate the negotiating period (and thus negotiation for a product); (iii) end the negotiating period by (a) abandoning the negotiation or (b) finalizing a contractual agreement; (iv) generate a summary of the negotiating period; (v) negotiate when the first contracting party is an AI chatbot; (vi) generate counter terms in a natural language format; and/or (vii) determine or generate based on (a) parameters indicated by the second contracting party, (b) a response signal from the second contracting party, (c) historical response signal (s), (d) historical negotiation(s) with the first contracting party, and/or (e) a conversation style of the first contracting party. The contractual agreement may correspond to one or more of (i) insurance coverage, (ii) an insurance settlement, (iii) a tangible product, or (iv) an intangible product. Additionally, the second contracting party may be one or more of (i) an insurance customer, (ii) an insurance provider, (iii) a vehicle owner, (iv) a vehicle buyer, (v) a homeowner, or (vi) a home buyer.

Moreover, and in some embodiments, generative artificial intelligence (AI) models (also referred to as generative machine learning (ML) models) including voice bots or chatbots may be configured to utilize artificial intelligence and/or machine learning techniques. Data input into the voice bots, chatbots, or other bots may include historical insurance claim data, historical home data, historical water damage data, sensor information, damage mitigation and prevention techniques, and other data. The data input into the bot or bots may include text, documents, and images, such as text, documents and images related to homes, claims, and water damage, damage mitigation and prevention, and sensors. In certain embodiments, a voice or chatbot may be a ChatGPT chatbot. The voice or chatbot may employ supervised or unsupervised machine learning techniques, which may be followed by, and/or used in conjunction with, reinforced or reinforcement learning techniques. In one aspect, the voice or chatbot may employ the techniques utilized for ChatGPT. The voice bot, chatbot, ChatGPT-based bot, ChatGPT bot, and/or other such generative model may generate audible or verbal output, text or textual output, visual or graphical output, output for use with speakers and/or display screens, and/or other types of output for user and/or other computer or bot consumption.

Exemplary Computing Environment

FIG. 1 depicts a computing environment 100 in which intelligent negotiation of terms may be performed, in accordance with various aspects discussed herein. In the exemplary aspect of FIG. 1, the computing environment 100 includes a first user device 102 and a second user device 103. In various aspects, the first user device 102 and/or the second user device 103 comprises one or more computers, which may comprise multiple, redundant, or replicated client computers accessed by one or more users. The computing environment 100 may further include a network 110 communicatively coupling other aspects of the computing environment 100. As referenced herein, a "first user device" may also be referenced as a "first contracting party device," a "second user device" may be referenced as a "second contracting party device," a "first contracting party" may be referenced as a "first user," and a "second contracting party" may be referenced as a "second user."

The first user device 102 and/or the second user device 103 may be any suitable device and include one or more mobile devices, wearables, smart watches, smart contact lenses, smart glasses, augmented reality glasses, virtual reality headsets, mixed or extended reality glasses or headsets, voice bots or chatbots 150, ChatGPT bots, and/or other electronic or electrical component. The first user device 102 and/or the second user device 103 may include a memory and a processor for, respectively, storing and executing one or more modules. The memory may include one or more suitable storage media such as a magnetic storage device, a solid-state drive, random access memory (RAM), etc. The first user device 102 and/or the second user device 103 may access services or other components of the computing environment 100 via the network 110.

Broadly speaking, the one or more servers 105 may be communicatively coupled to the first user device 102 and the second user device 103 via the network 110 and may be configured to perform some/all of the functionalities described herein as part of the intelligent terms negotiations. In certain aspects, the one or more servers 105 may be part of and/or otherwise operate within a cloud network or may otherwise communicate with other hardware or software components within one or more cloud computing environments to send, retrieve, or otherwise analyze data or information described herein. For example, in certain aspects, the computing environment 100 may comprise an on-premise computing environment, a multi-cloud computing environment, a public cloud computing environment, a private cloud computing environment, and/or a hybrid cloud computing environment, each of which are generally configured to provide the intelligent negotiation systems described herein.

Further, any suitable entity (e.g., a business) offering such an intelligent negotiation system may host one or more services in a public cloud computing environment (e.g., Alibaba Cloud, Amazon Web Services (AWS), Google Cloud, IBM Cloud, Microsoft Azure, etc.). The public cloud computing environment may be a traditional off-premise cloud (i.e., not physically hosted at a location owned/controlled by the business). Additionally, or alternatively, aspects of the public cloud may be hosted on-premise at a location owned/controlled by an enterprise associated with the intelligent negotiation of terms. The public cloud may be partitioned using visualization and multi-tenancy techniques and may include one or more infrastructure-as-a-service (IaaS) and/or platform-as-a-service (PaaS) services.

The network 110 may comprise any suitable network or networks, including a local area network (LAN), wide area network (WAN), Internet, or combination thereof. For example, the network 110 may include a wireless cellular service (e.g., 4G, 5G, etc.). Generally, the network 110 enables bidirectional communication between the first user device 102, the second user device 103, and the servers 105. In certain aspects, network 110 may comprise a cellular base station, such as cell tower(s), communicating to the one or more components of the computing environment 100 via wired/wireless communications based on any one or more of various mobile phone standards, including NMT, GSM, CDMA, UMMTS, LTE, 5G, or the like. Additionally or alternatively, network 110 may comprise one or more routers, wireless switches, or other such wireless connection points communicating to the components of the computing environment 100 via wireless communications based on any one or more of various wireless standards, including by non-limiting example, IEEE 802.11a/b/c/g (WIFI), Bluetooth, and/or the like.

The processor 120 may include one or more suitable processors (e.g., central processing units (CPUs) and/or graphics processing units (GPUs)). The processor 120 may be connected to the memory 122 via a computer bus (not depicted) responsible for transmitting electronic data, data packets, or otherwise electronic signals to and from the processor 120 and memory 122 in order to implement or perform the machine-readable instructions, methods, processes, elements or limitations, as illustrated, depicted, or described for the various flowcharts, illustrations, diagrams, figures, and/or other disclosure herein. The processor 120 may interface with the memory 122 via a computer bus to execute an operating system (OS) and/or computing instructions contained therein, and/or to access other services/aspects. For example, the processor 120 may interface with the memory 122 via the computer bus to create, read, update, delete, or otherwise access or interact with the data stored in the memory 122 and/or a database 126.

The memory 122 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The memory 122 may store an operating system (OS) (e.g., Microsoft Windows, Linux, UNIX, etc.) capable of facilitating the functionalities, apps, methods, or other software as discussed herein. The memory 122 may also store a plurality of computing modules 130, implemented as respective sets of computer-executable instructions (e.g., one or more source code libraries, trained ML models such as neural networks, convolutional neural networks, etc.) as described herein.

In general, a computer program or computer based product, application, or code (e.g., the model(s), such as ML models, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 120 (e.g., working in connection with the respective operating system in memory 122) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C #, Objective-C, Java, Scala, ActionScript, JavaScript, HTML, CSS, XML, etc.).

The database 126 may be a relational database, such as Oracle, DB2, MySQL, a NoSQL based database, such as MongoDB, or another suitable database. The database 126 may store data and be used to train and/or operate one or more ML/AI models, chatbots 150, and/or voice bots.

In some aspects, the computing modules 130 may include an ML module 140. The ML module 140 may include ML training module (MLTM) 142 and/or ML operation module (MLOM) 144. In some embodiments, at least one of a plurality of ML methods and algorithms may be applied by the ML module 140, which may include, but are not limited to: linear or logistic regression, instance-based algorithms, regularization algorithms, decision trees, Bayesian networks, cluster analysis, association rule learning, artificial neural networks, deep learning, combined learning, reinforced learning, dimensionality reduction, and support vector machines. In various embodiments, the implemented ML methods and algorithms are directed toward at least one of a plurality of categorizations of ML, such as supervised learning, unsupervised learning, and reinforcement learning.

In certain aspects, the ML based algorithms may be included as a library or package executed on server(s) 105. For example, libraries may include the TensorFlow based library, the Pytorch library, and/or the scikit-learn Python library.

In one embodiment, the ML module 140 employs supervised learning, which involves identifying patterns in existing data to make predictions about subsequently received data. Specifically, the ML module 140 is "trained" (e.g., via MLTM 142) using training data, which includes example inputs and associated example outputs. Based upon the training data, the ML module 140 may generate a predictive function which maps outputs to inputs and may utilize the predictive function to generate ML outputs based upon data inputs. The exemplary inputs and exemplary outputs of the training data may include any of the data inputs or ML outputs described above. In exemplary embodiments, a processing element may be trained by providing it with a large sample of data with known characteristics or features.

In another embodiment, the ML module 140 may employ unsupervised learning, which involves finding meaningful relationships in unorganized data. Unlike supervised learning, unsupervised learning does not involve user-initiated training based upon example inputs with associated outputs. Rather, in unsupervised learning, the ML module 140 may organize unlabeled data according to a relationship determined by at least one ML method/algorithm employed by the ML module 140. Unorganized data may include any combination of data inputs and/or ML outputs as described above.

In yet another embodiment, the ML module 140 may employ reinforcement learning, which involves optimizing outputs based upon feedback from a reward signal. Specifically, the ML module 140 may receive a user-defined reward signal definition, receive a data input, utilize a decision-making model to generate the ML output based upon the data input, receive a reward signal based upon the reward signal definition and the ML output, and alter the decision-making model so as to receive a stronger reward signal for subsequently generated ML outputs. Other types of ML may also be employed, including deep or combined learning techniques.

The MLTM 142 may receive labeled data at an input layer of a model having a networked layer architecture (e.g., an artificial neural network, a convolutional neural network, etc.) for training the one or more ML models. The received data may be propagated through one or more connected deep layers of the ML model to establish weights of one or more nodes, or neurons, of the respective layers. Initially, the weights may be initialized to random values, and one or more suitable activation functions may be chosen for the training process. The present techniques may include training a respective output layer of the one or more ML models. The output layer may be trained to output a prediction, for example.

The MLOM 144 may comprise a set of computer-executable instructions implementing ML loading, configuration, initialization and/or operation functionality. The MLOM 144 may include instructions for storing trained models (e.g., in the electronic database 126). As discussed, once trained, the one or more trained ML models may be operated in inference mode, whereupon when provided with de novo input that the model has not previously been provided, the model may output one or more predictions, classifications, etc., as described herein.

In certain aspects, the computing modules 130 may include an input/output (I/O) module 146, comprising a set of computer-executable instructions implementing communication functions. The I/O module 146 may include a communication component configured to communicate (e.g., send and receive) data via one or more external/network port(s) to one or more networks or local terminals, such as computer network 110 and/or a user device (e.g., 102, 103) (for rendering or visualizing) described herein. In certain aspects, servers 105 may include a client-server platform technology such as ASP.NET, Java J2EE, Ruby on Rails, Node.js, a web service or online API, responsive for receiving and responding to electronic requests.

I/O module 146 may further include or implement an operator interface configured to present information to an administrator or operator and/or receive inputs from the administrator and/or operator. An operator interface may provide a display screen. I/O module 146 may facilitate I/O components (e.g., ports, capacitive or resistive touch sensitive input panels, keys, buttons, lights, LEDs), which may be directly accessible via, or attached to, servers 105 or may be indirectly accessible via or attached to the first user device 102. According to an aspect, an administrator or operator may access the servers 105 via a user device (e.g., 102, 103) to review information, make changes, input training data, initiate training via the MLTM 142, and/or perform other functions (e.g., operation of one or more trained models via the MLOM 144).

In certain aspects, the computing modules 130 may include one or more NLP modules 148 comprising a set of computer-executable instructions implementing NLP, natural language understanding (NLU) and/or natural language generator (NLG) functionality. The NLP module 148 may be responsible for transforming the user input (e.g., unstructured conversational input such as speech or text) to an interpretable format. The NLP module may include NLU processing to understand the intended meaning of utterances, among other things. The NLP module 148 may include NLG which may provide text summarization, machine translation, and dialog where structured data is transformed into natural conversational language (i.e., unstructured) for output to the user.

In certain aspects, the computing modules 130 may include one or more chatbots and/or voice bots 150 which may be programmed to simulate human conversation, interact with users, understand their needs and/or intentions, and recommend an appropriate line of action with minimal and/or no human intervention, among other things. This may include providing a best/optimal determined response corresponding to received queries and/or asking follow-up questions.

In some embodiments, the voice bots or chatbots 150 discussed herein may be configured to utilize AI and/or ML techniques. For instance, the voice bot or chatbot 150 may be a ChatGPT chatbot. The voice bot or chatbot 150 may employ supervised or unsupervised machine learning techniques, which may be followed by, or used in conjunction with, reinforced or reinforcement learning techniques. The voice bot or chatbot 150 may employ the techniques utilized for ChatGPT.

Noted above, in some embodiments, a chatbot 150 or other computing device may be configured to implement ML, such that server 105 "learns" to analyze, organize, and/or process data without being explicitly programmed. ML may be implemented through ML methods and algorithms ("ML methods and algorithms"). In one exemplary embodiment, the ML module 140 may be configured to implement ML methods and algorithms.

For example, the server 105 may transmit a plurality of counter terms over the network 110 to a user (e.g., first contracting party) via a user device (e.g., 102), e.g., so the user may continue the negotiation by responding to the counter terms with new prospective terms. The chatbot 150 may subsequently receive prospective terms from the user, which the chatbot 150 may analyze to determine whether the plurality of prospective terms are acceptable terms. Accordingly, the prospective terms may be processed using NLP module 148 and/or ML module 140 via one or more ML models to recognize what the user has included in the prospective terms, understand the meaning of the prospective terms, determine an appropriate action (e.g., generate counter terms), and/or respond (e.g., transmit counter terms, finalize contractual agreement) with language the user may understand.

In certain aspects, the server 105 may host and/or provide an application (e.g., a mobile application) and/or website configured to provide the application to transmit and/or receive terms (e.g., prospective terms, counter terms) to/from a user. In some aspects, the server 105 may store code in memory 122 which when executed by CPU 120 may provide the website and/or application.

In some aspects, the application may use the chatbot 150 to negotiate with a user (e.g., first contracting party) on behalf of a second user (e.g., second contracting party) until a contractual agreement between the user and the second user is finalized (via the chatbot 150) or efforts to finalize a contractual agreement is abandoned (via the chatbot 150) by one or both parties. Data associated with the negotiation (e.g., negotiating period), such as response signals, product information, prospective terms, counter terms, acceptable terms, parameters indicated by a user, response signals from a user, a length of time of a negotiating period, whether a contractual agreement was finalized, data determined by the server 105 during intelligent negotiation (e.g., specific products desired by the user, first contracting parties associated with products desired by the second contracting party), metadata associated with the aforementioned data examples (e.g., data types, creation dates, time-stamps of receipt/transmission, etc.), and/or other suitable data may be captured by the server 105 as negotiating data. In some aspects, the server 105 may store the negotiating data in the database 126. The data may be cleaned, labeled, vectorized, weighted and/or otherwise processed, especially processing suitable for data used in any aspect of ML.

In a further aspect, anytime the server 105 evaluates a negotiation (e.g., a negotiating period, prospective terms, counter terms, response signals, conversation style of a contracting party), the associated information may be stored in the database 126. In certain aspects, the server 105 may use the stored data and/or negotiation data to generate, train and/or retrain one or more ML models and/or chatbots 150, and/or for any other suitable purpose.

In operation, ML model training module 142 may access the database 126 or any other data source for training data suitable to generate one or more ML models appropriate to intelligently negotiate terms, e.g., an ML chatbot 152. The training data may be sample data with assigned relevant and comprehensive labels (classes or tags) used to fit the parameters (weights) of an ML model with the goal of training it by example. In some aspects, training data may include historical negotiating data from past negotiations (e.g., negotiating periods). The negotiating data may include a product, a plurality of prospective terms, a plurality of counter terms, parameters indicated by a user, response signals from a user, a length of time of a negotiating period, whether a contractual agreement was finalized, as well as any other suitable training data. In certain aspects, once an appropriate ML model is trained and validated to provide accurate predictions and/or responses, e.g., the ML chatbot 152 generated by MLTM 142, the trained model and/or ML chatbot 152 may be loaded into MLOM 144 at runtime, may process the user inputs (e.g., prospective terms, parameters indicated by a user, response signals), and may generate outputs (e.g., counter terms, finalizing a contractual agreement, acceptable terms). The outputs may be generated as conversational dialog in written and/or verbal form, and/or may be or include any other suitable output format.

While various embodiments, examples, and/or aspects disclosed herein may include training and generating one or more ML models and/or ML chatbot 152 for the server 105 to load at runtime, it is also contemplated that one or more appropriately trained ML models and/or ML chatbot 152 may already exist (e.g., in database 126) such that the server 105 may load an existing trained ML model and/or ML chatbot 152 at runtime. It is further contemplated that the server 105 may retrain, update and/or otherwise alter an existing ML model and/or ML chatbot 152 before loading the model at runtime.

Although the computing environment 100 is shown to include two user devices (e.g., 102, 103), one server 105, and one network 110, it should be understood that different numbers of user devices, networks 110, and/or servers 105 may be utilized. In one example, the computing environment 100 may include a plurality of servers 105 and hundreds or thousands of user devices (e.g., 102, 103), all of which may be interconnected via the network 110. In another example, the computing environment 100 may include a single user device (e.g., 102, 103), accessible to multiple users. Furthermore, the database storage or processing performed by the one or more servers 105 may be distributed among a plurality of servers 105 in an arrangement known as "cloud computing." This configuration may provide various advantages, such as enabling near real-time uploads and downloads of information as well as periodic uploads and downloads of information.

The computing environment 100 may include additional, fewer, and/or alternate components, and may be configured to perform additional, fewer, or alternate actions, including components/actions described herein. Although the computing environment 100 is shown in FIG. 1 as including one instance of various components such as a first user device 102, a second user device 103, a server 105, and a network 110, etc., various aspects include the computing environment 100 implementing any suitable number of any of the components shown in FIG. 1 and/or omitting any suitable ones of the components shown in FIG. 1. For instance, information described as being stored at server database 126 may be stored at memory 122, and thus database 126 may be omitted. Moreover, various aspects include the computing environment 100 including any suitable additional component(s) not shown in FIG. 1, such as but not limited to the exemplary components described above. Furthermore, it should be appreciated that additional and/or alternative connections between components shown in FIG. 1 may be implemented. As just one example, server 105 and first user device 102 may be connected via a direct communication link (not shown in FIG. 1) instead of, or in addition to, via the network 110.

Exemplary Intelligent Negotiation of Terms within the Exemplary Computing Environment In some aspects, a first contracting party and a second contracting party may be negotiating terms for a contractual agreement. In this aspect, the first contracting party may be using the first user device 102 and the second contracting party be using the second user device 103. Both the first contracting party and the second contracting party (the parties) may use a user device to negotiate terms using a mobile application (app) provided by an enterprise. Both parties may sign into the application using their user credentials. The user credentials may be transmitted by the respective user device (e.g., 102, 103) via network 110 to the enterprise's server 105. The server 105 may verify the user credentials, e.g., using profile data of the second contracting party saved on database 126. Upon verification of the credentials by the server 105, the app may provide the parties access to one or more business functions associated with the enterprise, one of which may include intelligent negotiation of terms for a contractual agreement. The parties may select an app icon on the display of their user device (e.g., 102, 103) associated with intelligent negotiation of terms. Based upon a request for intelligent negotiation of terms, the server 105 may initiate a session (negotiating session) with the user device (e.g., 102, 103). The server 105 may also initiate a negotiation session with a user device (e.g., 102, 103) without one or both parties using an app. For example, the server 105 may receive a text message from a party indicating a request for intelligent negotiation.

Communication during the negotiating session between the first contracting party, the second contracting party, respective user devices (e.g., 102, 103), the server 105, and any combinations therein, may include one or more of (i) audio (e.g., a telephone call), (ii) text messages (e.g., short messaging/SMS, multimedia messaging/MMS, iPhone iMessages, etc.), (iii) instant messages (e.g., real-time messaging such as a chat window), (iv) communication using virtual reality, (v) communication using augmented reality, (vi) blockchain entries, (vii) communication in the metaverse, and/or any other suitable form of communication. In aspects, the first contracting party may include one or more AI/ML chatbots. Accordingly, communication between the AI chatbot and the server 105 may include one or more messaging formats/communication protocols such as JSON, XML, MQTT, AMQP, or any other suitable forms of communication between two AI/ML chatbots.

During the negotiating session a party may indicate a plurality of parameters regarding their preferences for the negotiation (e.g., desired product, priority product, acceptable terms, priority terms, maximum acceptable cost, negotiating style). The party may indicate the plurality of parameters to the server 105 via the app, and the server 105 may store the plurality of parameters on the database 126. The plurality of parameters may also be stored by the server 105 when no negotiating session is initiated. For example, parameters may be stored on the database 126 prior to a negotiating session when a party fills out their user profile and/or when parameters are indicated and/or determined during a prior negotiating session. In certain aspects, the plurality of parameters indicated by a party (e.g., the second contracting party) may include a desired product ranging in specificity (e.g., a car, a manual transmission 2001 Toyota Echo, a diamond bracelet, a Tiffany tennis bracelet in platinum with 24 carat diamonds), a prioritized product list (e.g., a list indicating an optimal product to obtain, the least optimal but acceptable product to obtain, and products in between the two extremes), a set of priority contractual terms (e.g., a set of terms to prioritize over other terms), a maximum acceptable cost (e.g., 0.5 Bitcoin, the highest amount the party is willing to pay), or a negotiating style (e.g., aggressive, collaborative, congenial, amenable).

In some aspects, the second contracting party may indicate a plurality of parameters, which the server 105 may store in the database 126. The server 105 may subsequently receive a plurality of prospective terms for a contractual agreement from the first contracting party and store the plurality of prospective terms in the database 126. In certain aspects, receipt of the plurality of prospective terms may initiate a negotiating period, which may be understood herein as a period in which negotiation between two parties is taking place as a result of one party receiving terms (e.g., prospective terms, acceptable terms). The first contracting party may be sending the plurality of prospective terms via the app or via other forms of communication described herein.

Once the server 105 obtains the plurality of prospective terms, the server 105 may determine whether the plurality of prospective terms are acceptable terms via a chatbot 150 based on the plurality of parameters indicated by the second contracting party. The chatbot 150 may be the ML chatbot 152, an AI chatbot such as a ChatGPT chatbot, a voice bot and/or any other suitable chatbot described herein. In some aspects, the ML chatbot 152 may be hosted on a ChatGPT server (not illustrated). The server 105 may select an appropriate chatbot 150 based upon the method of communication with the party, one or more pieces of information either party provides to the server 105 and/or other aspects of the negotiation. In one example, the server 105 may train (e.g., via ML module 140 and/or MLTM 142) the ML chatbot 152 to handle specific types of negotiations or aspects of negotiations.

For example, a second contracting party may need an attestation of their company's finances to inform their upcoming purchase of insurance. A plurality of prospective terms received by the server 105 may be associated with a first contracting party selling their services (e.g., product) as a certified public accountant (CPA) and include terms such as a $4,000 retainer for a year period with services such as attestation services at a fixed fee of $1,000. One of the parameters indicated by the second contracting party may be a priority products list with the optimal product being a CPA to urgently attest company finances for $1,000 and the least optimal product being a CPA to attest company finances for $5,000 by the end of the month. The trained chatbot 152 may determine the plurality of prospective terms to be unacceptable terms because, for example, it has been trained to recognize when prospective terms do not address all elements indicated by the plurality of parameters (e.g., time period for delivery of product) and it has been trained to prioritize finalizing a contractual agreement with the most optimal terms for the second contracting party. In this example, the prospective terms indicate a period of retainer for attestation services but not a period when attestation services (the product) would be complete.

In aspects where the chatbot 150 determines the plurality of prospective terms is unacceptable terms, the server 105 may generate a plurality of counter terms via the chatbot 150 based on the plurality of parameters. The server 105 may select a different chatbot 150 specifically trained to handle the aspect of the negotiation regarding generation of a plurality of counter terms. Continuing the previous example, the ML chatbot 152 may generate a plurality of counter terms such as the CPA providing attestation services for (i) $1,500 (ii) completed in five business days (iii) with no required retainer. The server 105 may subsequently transmit the counter terms to the first contracting party by the same or different means of communication the plurality of prospective terms was received.

Further in the prior example, the server 105 may have negotiated with the first contracting party one or more times. Accordingly, in aspects the server 105 may generate, via the chatbot 150, a plurality of counter terms based on the one or more historical negotiations with the first contracting party. For example, the second contracting party may have previously utilized the server 105 for intelligent negotiation of terms with the CPA regarding the CPA providing tax filing services. The associated negotiating data from the negotiating period may be stored on the database 126 and used by the ML chatbot 152 to generate counter terms regarding attestation services.

In some aspects, the second contracting party may not indicate a specific product they desire (or a specific contracting party) but may instead indicate a plurality of parameters to the server 105 that, if met by a product and corresponding contractual agreement, would be acceptable to the second contracting party. In these aspects, the server 105 may determine a specific product desired by the second contracting party via the chatbot 150 based on the plurality of parameters. The server 105 may subsequently obtain data (e.g., negotiating data, user profile data) from the data base 126 and determine, via the chatbot 150, one or more contracting parties corresponding to the specific product.

For example, parties may indicate, via the app, products they want to sell including specific parameters about the product(s) or a plurality of parameters indicating the acceptable terms for the respective party. This information may be stored on the database 126 as negotiating data, or as data incorporated with the user profile of the associated party, for example. The server 105, via the chatbot 150, may then determine one or more contracting parties based on the specific product and obtained data. In some aspects, the server 105 may subsequently send a plurality of acceptable terms based on the plurality of parameters indicated by the second contracting party to the one or more contracting parties associated with the specific product. By doing so, the server 105 may initiate a negotiating period, wherein the server 105 may further receive prospective terms from the one or more contracting parties and continue negotiating on behalf of the second contracting party.

The negotiating period may end when one of the parties accepts the terms (e.g., prospective terms, counter terms, acceptable terms) finalized in a contractual agreement or when one of the parties, or a chatbot, abandons efforts to finalize the contractual agreement. In some aspects, the chatbot 150 may determine a plurality of prospective terms to be acceptable based on a plurality of parameters indicated by the second contracting party. The server 105 may send the plurality of prospective terms to the second contracting party via the app on the second user device 103 which the second contracting party may review. The server 105 may subsequently receive a response signal from the second user device 103 and determine whether the response signal indicates that the second contracting party accepts the plurality of prospective terms. Responsive to determining that the response signal indicates that the second contracting party accepts the plurality of prospective terms, the server 105 may finalize a contractual agreement between the first contracting party and the second contracting party with the plurality of prospective terms, thereby ending the negotiating period.

Alternatively, and responsive to determining that the response signal indicates that the second contracting party declines the plurality of prospective terms, the server 105 may generate, via the chatbot 150, a plurality of counter terms based on the plurality of parameters. The server 105 may send the plurality of counter terms to the first contracting party via the app on the first user device 102. In some aspects, the second contracting party may indicate, via the response signal, individual prospective terms of the plurality of prospective terms to be acceptable. In these aspects, the server 105 may determine the accepted and/or declined prospective terms of the plurality of prospective terms and generate, via the chatbot 150, a plurality of counter terms based on the plurality of parameters and the response signal. Furthermore, in certain instances, the server 105 may send prospective terms and/or counter terms to the party for which the server 105 is negotiating on behalf of (e.g., second contracting party) at any moment in the negotiating period and subsequently receive a response signal.

In certain aspects, the second contracting party may have utilized the server 105 on one or more occasions. Accordingly, data corresponding to historical negotiating session(s) or negotiating period(s), may be stored on the database 126 and utilized for intelligent negotiation of terms. For example, in some aspects the chatbot 150 may determine if a plurality of prospective terms (received by the server 105 from the first user device 102) are acceptable terms based on a plurality of historical response signals received from the second contracting party via the second user device 103.

In some aspects, the server 105 may determine, via the chatbot 150, that subsequently generated counter terms may be unacceptable terms to the first contracting party and determine, via the AI chatbot, to abandon negotiations with the first contracting party, thereby ending the negotiating period. Accordingly, the server 105 may prohibit receipt of subsequent prospective terms from the first contracting party for the product being negotiated and/or in general.

For example, the server 105 may have received multiple pluralities of prospective terms from a first contracting party responding to multiple pluralities of counter terms generated by the chatbot 150. In other words, the negotiation may have undergone multiple rounds of discussion. In this example, the first contracting party may have a term (e.g., price, length of contract) on which they are unwilling/unable to compromise for the product. The multiple pluralities of prospective terms may indicate this by the term remaining constant throughout the negotiating period, despite any counter terms generated by the chatbot 150, and may indicate a possible deadlock if the second contracting party and/or plurality of parameters also indicate an unwillingness to compromise on the term.

Thus, in the previous example, the chatbot 150 may determine that subsequently generated counter terms may be unacceptable to the first contracting party and, as a result, to abandon negotiations with the first contracting party. These determinations may be based on any of the multiple pluralities of prospective terms, counter terms, and/or acceptable terms determined during the negotiating period, and/or historical negotiating data associated with the first or second contracting party. This example may be representative of a negotiation in which a contract is unable to be finalized due to terms not being accepted and no agreement is able to be reached between the parties. The chatbot 150 may be trained to determine deadlocked negotiations and abandon negotiations to prevent unnecessary use of resources. The server 105 may prohibit receipt of subsequent prospective terms from any party/user in which negotiations were abandoned and/or prohibit communication between the parties involved.

By contrast, and in some aspects, the first contracting party may accept a plurality of counter terms previously sent/transmitted by the server 105 and thereby agree to finalize a contractual agreement. For example, upon receipt of a plurality of counter terms the first contracting party may find the terms to be acceptable and send a response signal associated with the plurality of counter terms via the first user device 102. The server 105 may receive the response signal and determine whether the response signal indicates the first contracting party accepts the plurality of counter terms. Responsive to determining that the response signal indicates that the first contracting party accepts the plurality of counter terms, the server 105 may finalize a contractual agreement between the first contracting party and the second contracting party with the plurality of counter terms, thereby ending the negotiating period. In these and other aspects, finalizing a contractual agreement may include electronically transmitting a final contractual agreement document requiring a signature (e.g., DocuSign), cause a final contractual agreement document to be delivered to the participating parties by other means, or the server 105 authoritatively finalizing the final contractual agreement document on behalf of the respective party.

In some aspects the contractual agreement may correspond to insurance coverage, an insurance settlement, a tangible product (e.g., a car, jewelry, a painting), and/or an intangible product (e.g., insurance coverage, providing a service). For example, a homeowner may want to find new homeowner's insurance with better coverage. The homeowner may request intelligent negotiation of terms for a contractual agreement with an insurance company for home insurance from the app on the second user device 103. The homeowner may input the coverage provided by the homeowner's current home insurance into the app as a plurality of parameters and indicate the acceptable terms will expand coverage while maintaining cost. The first user device 102 may accordingly belong to an insurance company and send a plurality of prospective terms to the server 105. The server 105 may intelligently negotiate terms via the chatbot 150 until the homeowner or the insurance company send a response signal to the server 105 indicating they accept the terms (e.g., prospective terms, counter terms) and a contractual agreement is finalized corresponding to insurance coverage for the homeowner's home. Furthermore, in certain aspects, the second contracting party may be one or more of an insurance customer, an insurance provider, a vehicle owner, a vehicle buyer, a homeowner, or a home buyer.

In some aspects, the first contracting party may be a plurality of contracting parties. For example, the second contracting party may want to buy a car which is jointly owned by two first contracting parties. The server 105 may thus negotiate on behalf of the second contracting party with one or both of the joint owners of the car. In other examples, the second contracting party and multiple first contracting parties may each have a product desired by one or more of the parties involved. In this example, the server 105 may implement intelligent negotiation of terms for the multiple products and multiple parties on behalf of the second contracting party.

In certain aspects, the server 105 may intelligently negotiate terms by customizing communications/exchanges of information according to a conversation style of the first contracting party. For example, in aspects the server 105 may determine, via the chatbot 150, a conversation style of the first contracting party. The server 105 may use the NLP module 148 to process prospective terms and/or other communications with the first contracting party for the chatbot 150 to determine a conversation style. In one example, the server 105 may use an ML chatbot 152 trained (e.g., via ML module 140 and/or MLTM 142) to determine conversation styles based on outputs from the NLP module 148. The same, or different, ML chatbot 152 may subsequently generate a plurality of counter terms based on the conversation style. In some aspects, the server 105 may additionally, or alternatively, use the NLP module 148 (which may include NLU and/or NLG) to process a plurality of parameters, a plurality of prospective terms, and/or a plurality of counter terms when received or before transmission. In certain aspects, the server 105 may generate the plurality of counter terms in a natural language format by using the NLP module 148.

In some aspects, the server 105 may generate, via the chatbot 150, a summary of the negotiating period during or after the negotiating period. The summary may be requested by the first and/or second contracting party, or automatically sent to the first and/or second contracting party at certain milestones (e.g., 10 minutes, 5 exchanges of prospective and counter terms). The summary may include pluralities of prospective terms (e.g., a list of each plurality of prospective terms received from the first contracting party), one or more parameters of the plurality of parameters utilized to determine whether a plurality of prospective terms are acceptable terms, the plurality of counter terms (e.g., a list of each plurality of counter terms generated and/or sent to the first contracting party), one or more parameters of the plurality of parameters utilized to generate the plurality of counter terms, a length of time of the negotiating period, a time stamp corresponding to receipt or transmission of terms associated with the contractual agreement, the contractual agreement itself, and/or any other data/metadata associated with the negotiating period and/or session.

Exemplary Implementation for AI/ML Chatbot for Negotiations

Figure 2A:
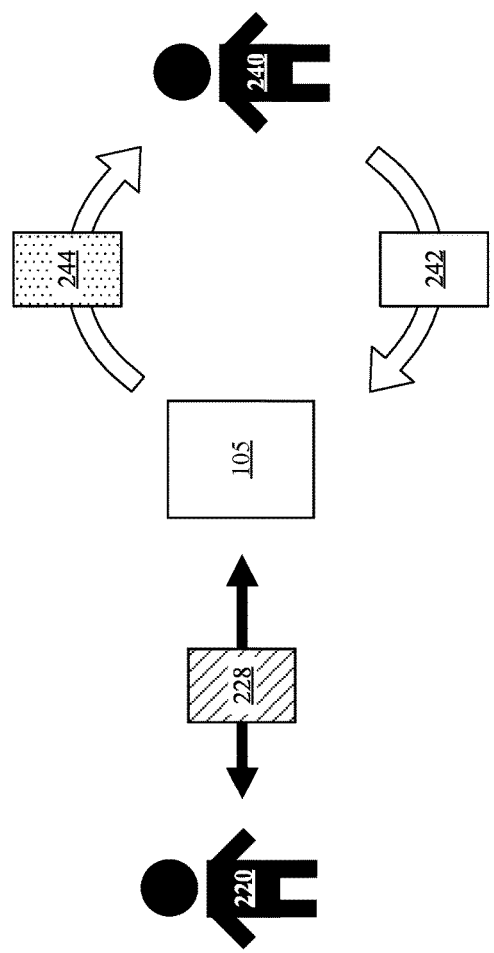
FIG. 2A depicts an exemplary implementation of a computer system for AI/ML chatbot for negotiations wherein the computer system negotiates with a first contracting party on behalf of a second contracting party.

FIG. 2A depicts an exemplary implementation 200 of a computer system for AI/ML chatbot for negotiations wherein the computing system (via server 105) may negotiate with a first contracting party 240 on behalf of a second contracting party 220, in accordance with various embodiments described herein. In general, the exemplary implementation 200 of FIG. 2A illustrates a negotiating session and/or a negotiating period. In particular, the exemplary implementation 200 of FIG. 2A illustrates the exchange of information (e.g., terms, parameters, signals) between a second contracting party 220, a first contracting party 240, and the server 105, during a negotiating session and/or a negotiating period.

In various embodiments, the server 105 may receive input e.g., from the second contracting party 220 and/or the first contracting party 240, and send output e.g., to the second contracting party 220 and/or first contracting party 240. For example, the server 105 may receive/send input/output 228 from the second contracting party 220 via a personal electronic device (e.g., second user device 103). The input/output 228 may be a plurality of parameters sent by the second contracting party 220 and sent to/utilized by the server 105 to determine (i) a product desired by the second contracting party 220, (ii) a priority product(s), (ii) acceptable terms, (iv) a priority term(s), (v) a maximum acceptable cost for a product, (vi) a negotiating style preferred by the second contracting party, and/or (iii) counter terms likely acceptable to the second contracting party 220. Additionally, or alternatively, the input/output 228 may be a response signal.

For example, the server 105 may receive input/output 228 indicating a plurality of parameters for a product desired by the second contracting party 220. The server 105 may determine a specific product desired by the second contracting party 220 based on the plurality of parameters and determine the specific product corresponds to a first contracting party 240. The server 105 may subsequently send output 244 to the first contracting party 240 (e.g., via the first user device 102) indicating a plurality of acceptable terms (acceptable to the second contracting party 220) for the specific product. The first contracting party 240 may thereafter propose new terms (prospective terms) for the specific product and the server 105 may receive input 242 from the first contracting party 240 indicating the prospective terms. The server 105 may determine the prospective terms of input 242 to be unacceptable terms and send output 244 to the first contracting party 240 indicating a plurality of counter terms generated by the server 105.

The exchange of terms via output(s) 244 and input(s) 242 may be characterized as a negotiation. The negotiation between the first contracting party 240 and the server 105 on behalf of the second contracting party 220 may continue for any number of cycles, wherein the server 105 may receive input(s) 242 indicating prospective terms and may send output(s) 244 indicating counter terms until a set of terms (e.g., prospective terms, counter terms) acceptable to both parties is finalized by a contractual agreement or the negotiation is abandoned by one or both parties. For example, the negotiation may be abandoned when the first contracting party 240 may abandon the negotiation and the server 105 may not receive the input 242, and/or the server 105 may determine subsequently generated counter terms that may be unacceptable terms to the first contracting party 240, such that the server 105 may not send the output 244 and/or may prohibit receipt of the input 242. In any event, the negotiation may include the negotiating session and/or the negotiating period, as described elsewhere herein.

In some embodiments, the server 105 may determine prospective terms of the input 242 to be acceptable terms to the second contracting party 220 and may not send the output 244 indicating counter terms. In various embodiments, the server 105 may determine prospective terms of the input 242 to be acceptable terms and send the input/output 228 to the second contracting party 220 indicating the prospective terms. The server 105 may subsequently receive the input/output 228 in the form of a response signal from the second contracting party 220 indicating whether the second contracting party 220 accepts the plurality of prospective terms. In certain embodiments where the response signal may indicate the second contracting party 220 accepts the plurality of prospective terms, the server 105 may finalize a contractual agreement between the first contracting party 240 and the second contracting party 220 with the plurality of prospective terms. In some embodiments where the response signal may indicate the second contracting party 220 does not accept (declines) the plurality of prospective terms, the server 105 may generate a plurality of counter terms based on the plurality of prospective terms and send the output 244 to the first contracting party 240 indicating the generated counter terms.

In various embodiments, the input/output 228 may be any communication between the second contracting party 220 and the server 105. Of course, this communication may be or include any suitable form(s) of communication described elsewhere herein. For example, the input/output 228 may be a text message sent to the server 105 requesting intelligent negotiation and thereby initiating a negotiating session.

Figure 2B:
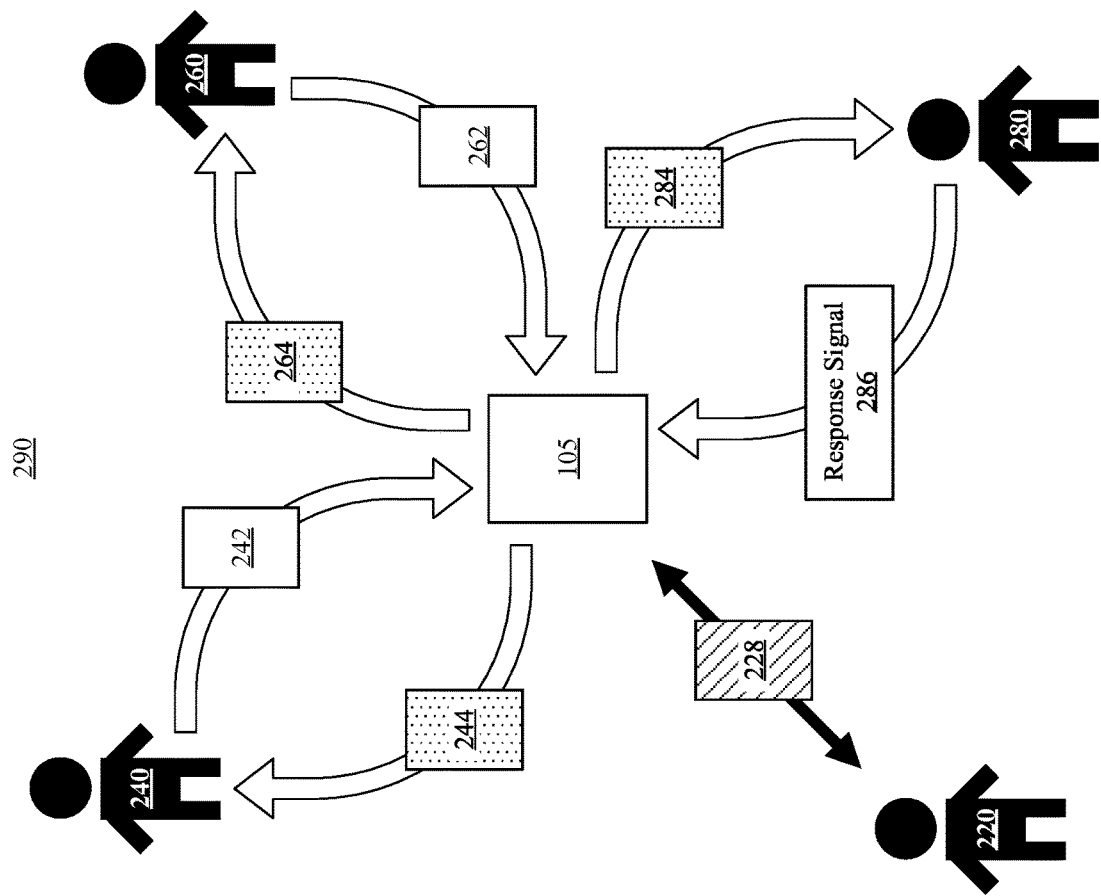
FIG. 2B depicts an exemplary implementation of a computer system for AI/ML chatbot for negotiations wherein the computer system negotiates with a plurality of first contracting parties on behalf of a second contracting party.

FIG. 2B depicts an exemplary implementation 290 of a computer system for AI/ML chatbot for negotiations wherein the computer system negotiates with a plurality of first contracting parties on behalf of a second contracting party, in accordance with various embodiments described herein. In general, the exemplary implementation 290 of FIG. 2B illustrates a plurality of negotiating sessions and/or negotiating periods. In particular, the exemplary implementation 290 of FIG. 2B illustrates the exchange of information (e.g., terms, parameters, signals) between a plurality of contracting parties (e.g., 220, 240, 260, 280) and the server 105, during respective negotiating sessions and/or negotiating periods.

In some embodiments, the server 105 may negotiate with multiple contracting parties at once. For example, as shown in FIG. 2A, the server 105 may negotiate with the first contracting party 240 on behalf of the second contracting party 220 by receiving input(s) (e.g., 228, 242) from the first contracting party 240 and second contracting party 220 and/or sending output(s) (e.g., 228, 244) to the first contracting party 240 and second contracting party 220. Similarly, as shown in FIG. 2B, the server 105 may negotiate with a third contracting party 260 and a fourth contracting party 280 by sending output(s) (e.g., 264, 284) and receiving input(s) (e.g., 262, 286). The exchange of input(s) 262 and outputs(s) 264 may be characterized as a negotiation between the third contracting party 260 and the server 105 on behalf of the second contracting party 220. The exchange of output 284 and input 286 may be characterized as the end of a negotiation between the third contracting party 260 and the server 105 on behalf of the second contracting party 220.

For example, the server 105 may send output 284 indicating counter terms to the fourth contracting party 280. In response to finding the counter terms acceptable, the fourth contracting party 280 may send a response signal 286 as input indicating the fourth contracting party 280 accepts the counter terms of output 284. The server 105 may thereafter determine the response signal 286 indicates the fourth contracting party 280 accepts the counter terms, and the server 105 may then finalize a contractual agreement between the second contracting party 220 and the fourth contracting party 280 with the counter terms of output 284. In certain embodiments, finalizing a contractual agreement may end a negotiating period and/or session. In various embodiments, negotiations may progress through any number of cycles of exchange of terms before the end of the negotiation (e.g., negotiating session/period). Continuing the previous example, the negotiation conducted by the server 105 with the fourth contracting party 280 may include any number of input(s) or outputs(s) 284 before receiving the response signal 286 from the fourth contracting party 280.

In some embodiments, each of the respective negotiations illustrated in FIG. 2B may be for the same or different product(s). For example, server 105 may determine the second contracting party 220 desires a first, second, and third product based on the input/output 228 indicating a plurality of parameters. The server 105 may subsequently determine the first contracting party 240 corresponds to the first product, the third contracting party 260 corresponds to the second product, and the fourth contracting party 280 corresponds to the third product. The server 105 may thereafter send outputs 244, 264, and 284 to respective contracting parties 240, 260, 280 indicating respective acceptable terms and thereby initiate negotiating periods with each respective contracting party 240, 260, 280. In certain embodiments, the server 105 may conduct any suitable number of negotiations for any suitable number of different products at any given time on behalf of the second contracting party 220.

In another example, the server 105 may determine the second contracting party 220 desires a single item and may determine more than one corresponding contracting party (e.g., 240, 260, 280). Subsequently, the server 105 may send outputs 244, 264, 284 indicating similar acceptable terms. As illustrated, the server 105 may receive inputs 242, 262 indicating prospective terms from contracting parties 240, 260 and may receive the response signal 286 from the fourth contracting party 280 indicating the acceptable terms (to the second contracting party 220) to be acceptable to the fourth contracting party 280. The server 105 may thereafter finalize a contractual agreement with the fourth contracting party 280 and cancel negotiations with the first contracting party 240 and the third contracting party 260. Namely, the server 105 may send outputs 244, 264 indicating a withdrawal of acceptable terms, and/or the server 105 may prohibit receipt of any inputs 242, 263 indicating e.g., prospective terms, response signals.

Exemplary Methods for AI/ML Chatbot for Negotiations

FIG. 3 depicts a flow diagram representing an exemplary computer-implemented method 300 for AI/ML chatbot for negotiations, in accordance with various embodiments described herein. The method 300 may be implemented by a computing system 100 such as the server 105, the user device 102, and/or the user device 103.

The method 300 may include receiving, from a first contracting party during a negotiating period, a plurality of prospective terms for a contractual agreement (block 302).

The method 300 may further include determining, via an AI chatbot, whether the plurality of prospective terms are acceptable terms based on a plurality of parameters indicated by a second contracting party (block 304).

The method 300 may further include, responsive to determining that the plurality of prospective terms are unacceptable terms, generating, via the AI chatbot, a plurality of counter terms based on the plurality of parameters (block 306).

The method 300 may further include transmitting the plurality of counter terms to the first contracting party (block 308).

In various embodiments, the method 300 may further include initiating a negotiation period by determining a product desired by the second contracting party based on the plurality of parameters indicated by the second contracting party; determining one or more contracting parties corresponding to the product; and sending a plurality of acceptable terms to the one or more contracting parties. The plurality of acceptable terms may be based on the plurality of parameters indicated by the second contracting party.

In some embodiments, the method 300 may further include ending a negotiation period by, responsive to determining that the plurality of prospective terms are acceptable terms, sending the plurality of prospective terms to the second contracting party; receiving, from the second contracting party, a response signal; determining whether the response signal indicates that the second contracting party accepts the plurality of prospective terms; responsive to determining that the response signal indicates that the second contracting party accepts the plurality of prospective terms; finalizing the contractual agreement between the first contracting party and the second contracting party with the plurality of prospective terms; responsive to determining that the response signal indicates that the second contracting party declines the plurality of prospective terms; generating, via the AI chatbot, a plurality of counter terms based on the plurality of parameters; and sending the plurality of counter terms to the first contracting party.

In certain embodiments, the method 300 may further include the AI chatbot determining the plurality of prospective terms are acceptable terms based on a plurality of historical response signals received from the second contracting party.

In various embodiments, the method 300 may further include receiving, from the first contracting party, a response signal associated with the plurality of counter terms; determining whether the response signal indicates the first contracting party accepts the plurality of counter terms; and, responsive to determining that the response signal indicates that the first contracting party accepts the plurality of counter terms, finalizing the contractual agreement between the first contracting party and the second contracting party with the plurality of counter terms.

In some embodiments, the method 300 may further include determining, via the AI chatbot, that subsequently generated counter terms may be unacceptable terms to the first contracting party; determining, via the AI chatbot, to abandon negotiations with the first contracting party; and prohibiting receipt of subsequent prospective terms from the first contracting party.

In certain embodiments, the plurality of parameters indicated by the second contracting party may be or include one or more of (i) a desired product, (ii) a prioritized product list, (iii) a set of priority contractual terms, (iv) a maximum acceptable cost, or (v) a negotiating style.

In various embodiments, the first contracting party may be or include one or more AI chatbots.

In some embodiments, the method 300 may further include generating, via the AI chatbot, the plurality of counter terms based on one or more historical negotiations with the first contracting party.

In certain embodiments, the method 300 may further include the contractual agreement corresponding to one or more of (i) insurance coverage, (ii) an insurance settlement, (iii) a tangible product, or (iv) an intangible product.

In various embodiments, the second contracting party may be or include one or more of (i) an insurance customer, (ii) an insurance provider, (iii) a vehicle owner, (iv) a vehicle buyer, (v) a homeowner, or (vi) a home buyer.

In some embodiments, the method 300 may further include the first contracting party including a plurality of contracting parties.

In certain embodiments, the method 300 may further include generating, via the AI chatbot, a summary of the negotiating period, the summary including one or more of: (i) the plurality of prospective terms, (ii) one or more parameters of the plurality of parameters utilized to determine whether the plurality of prospective terms are acceptable terms, (iii) the plurality of counter terms, (iv) one or more parameters of the plurality of parameters utilized to generate the plurality of counter terms, (v) a length of time of the negotiating period, (vi) a time stamp corresponding to receipt or transmission of terms associated with the contractual agreement, or (vii) the contractual agreement.

In various embodiments, the method 300 may further include generating, via the AI chatbot, the plurality of counter terms in a natural language format.

In some embodiments, the method 300 may further include determining, via the AI chatbot, a conversation style of the first contracting party; and generating, via the AI chatbot, the plurality of counter terms based on the conversation style.

In certain embodiments, the AI chatbot may be or include a chatbot hosted on a ChatGPT server.

Additional Considerations

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Upon reading this disclosure, those of skill in the art will appreciate still additional alternative structural and functional designs for the approaches described herein. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

Furthermore, the patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The invention claimed is:

1. A computer system for intelligent negotiation of terms by an artificial intelligence (AI) chatbot, the computer system comprising:
   one or more processors; and
   a memory storing executable instructions thereon that, when executed by the one or more processors, cause the one or more processors to:
      determine or retrieve a plurality of parameters indicated by a second contracting party, the plurality of parameters including one or more of: (i) a prioritized product list, (ii) a set of priority contractual terms, or (iii) a negotiating style, receive, from a first contracting party during a negotiating period, a plurality of prospective terms for a contractual agreement, determine, via the AI chatbot, whether the plurality of prospective terms are acceptable terms based on the plurality of parameters indicated by the second contracting party, responsive to determining that the plurality of prospective terms are unacceptable terms, generate, via the AI chatbot, a plurality of counter terms based on the plurality of parameters, and transmit the plurality of counter terms to the first contracting party.

2. The computer system of claim 1, wherein the instructions, when executed by the one or more processors, may further cause the one or more processors to:

initiate, via the AI chatbot, the negotiating period by:

determining a product desired by the second contracting party based on the plurality of parameters indicated by the second contracting party, determining one or more contracting parties corresponding to the product, and sending a plurality of acceptable terms to the one or more contracting parties, the plurality of acceptable terms based on the plurality of parameters indicated by the second contracting party.

3. The computer system of claim 1, wherein the instructions, when executed by the one or more processors, may further cause the one or more processors to:

end the negotiating period by:

responsive to determining that the plurality of prospective terms are acceptable terms, sending the plurality of prospective terms to the second contracting party, receiving, from the second contracting party, a response signal, determining whether the response signal indicates that the second contracting party accepts the plurality of prospective terms, responsive to determining that the response signal indicates that the second contracting party accepts the plurality of prospective terms, finalizing the contractual agreement between the first contracting party and the second contracting party with the plurality of prospective terms, responsive to determining that the response signal indicates that the second contracting party declines the plurality of prospective terms, generating, via the AI chatbot, a plurality of counter terms based on the plurality of parameters, and sending the plurality of counter terms to the first contracting party.

4. The computer system of claim 3, wherein the AI chatbot determines if the plurality of prospective terms are acceptable terms based on a plurality of historical response signals received from the second contracting party.

5. The computer system of claim 1, wherein the instructions, when executed by the one or more processors, may further cause the one or more processors to:

receive, from the first contracting party, a response signal associated with the plurality of counter terms;

determine whether the response signal indicates the first contracting party accepts the plurality of counter terms; and responsive to determining that the response signal indicates that the first contracting party accepts the plurality of counter terms, finalize the contractual agreement between the first contracting party and the second contracting party with the plurality of counter terms.

6. The computer system of claim 1, wherein the instructions, when executed by the one or more processors, may further cause the one or more processors to:

determine, via the AI chatbot, that subsequently generated counter terms may be unacceptable terms to the first contracting party;

determine, via the AI chatbot, to abandon negotiations with the first contracting party; and prohibit receipt of subsequent prospective terms from the first contracting party.

7. The computer system of claim 1, wherein the plurality of parameters indicated by the second contracting party may be one or more of (i) a desired product, or (ii) a maximum acceptable cost.

8. The computer system of claim 1, wherein the first contracting party includes one or more AI chatbots.

9. The computer system of claim 1, wherein the instructions, when executed by the one or more processors, may further cause the one or more processors to:

generate, via the AI chatbot, the plurality of counter terms based on one or more historical negotiations with the first contracting party.

10. The computer system of claim 1, wherein the contractual agreement corresponds to one or more of (i) insurance coverage, (ii) an insurance settlement, (iii) a tangible product, or (iv) an intangible product.

11. The computer system of claim 1, wherein the second contracting party is one or more of (i) an insurance customer, (ii) an insurance provider, (iii) a vehicle owner, (iv) a vehicle buyer, (v) a homeowner, or (vi) a home buyer.

12. The computer system of claim 1, wherein the first contracting party includes a plurality of contracting parties.

13. The computer system of claim 1, wherein the instructions, when executed by the one or more processors, may further cause the one or more processors to:

generate, via the AI chatbot, a summary of the negotiating period, the summary including one or more of:
(i) the plurality of prospective terms,
(ii) one or more parameters of the plurality of parameters utilized to determine whether the plurality of prospective terms are acceptable terms,
(iii) the plurality of counter terms,
(iv) one or more parameters of the plurality of parameters utilized to generate the plurality of counter terms,
(v) a length of time of the negotiating period,
(vi) a time stamp corresponding to receipt or transmission of terms associated with the contractual agreement, or
(vii) the contractual agreement.

14. The computer system of claim 1, wherein the instructions, when executed by the one or more processors, may further cause the one or more processors to:

generate, via the AI chatbot, the plurality of counter terms in a natural language format.

15. The computer system of claim 1, wherein the instructions, when executed by the one or more processors, may further cause the one or more processors to:

determine, via the AI chatbot, a conversation style of the first contracting party; and generate, via the AI chatbot, the plurality of counter terms based on the conversation style.

16. The computer system of claim 1, wherein the AI chatbot is a chatbot hosted on a server including a generative pre-trained transformer chatbot.

17. A computer-implemented method for intelligent negotiation of terms by an artificial intelligence (AI) chatbot, the method comprising:
- determining or retrieve a plurality of parameters indicated by a second contracting party, the plurality of parameters including one or more of: (i) a prioritized product list, (ii) a set of priority contractual terms, or (iii) a negotiating style;
- receiving, from a first contracting party during a negotiating period, a plurality of prospective terms for a contractual agreement;
- determining, via the AI chatbot, whether the plurality of prospective terms are acceptable terms based on the plurality of parameters indicated by the second contracting party;
- responsive to determining that the plurality of prospective terms are unacceptable terms, generating, via the AI chatbot, a plurality of counter terms based on the plurality of parameters; and
- transmitting the plurality of counter terms to the first contracting party.

18. The computer-implemented method of claim 17, further comprising:
- initiating, via the AI chatbot, the negotiating period by:
- determining a product desired by the second contracting party based on the plurality of parameters indicated by the second contracting party,
- determining one or more contracting parties corresponding to the product, and
- sending a plurality of acceptable terms to the one or more contracting parties, the plurality of acceptable terms based on the plurality of parameters indicated by the second contracting party.

19. A non-transitory computer-readable storage medium comprising non-transitory computer readable instructions stored thereon for intelligent negotiation of terms by an artificial intelligence (AI) chatbot, wherein the instructions when executed on one or more processors cause the one or more processors to:
- determine or retrieve a plurality of parameters indicated by a second contracting party, the plurality of parameters including one or more of: (i) a prioritized product list, (ii) a set of priority contractual terms, or (iii) a negotiating style;
- receive, from a first contracting party during a negotiating period, a plurality of prospective terms for a contractual agreement;
- determine, via the AI chatbot, whether the plurality of prospective terms are acceptable terms based on the plurality of parameters indicated by the second contracting party;
- responsive to determining that the plurality of prospective terms are unacceptable terms, generate, via the AI chatbot, a plurality of counter terms based on the plurality of parameters; and
- transmit the plurality of counter terms to the first contracting party.

20. The non-transitory computer-readable storage medium of claim 19, wherein the instructions, when executed, further cause the one or more processors to:
- initiate, via the AI chatbot, the negotiating period by:
- determining a product desired by the second contracting party based on the plurality of parameters indicated by the second contracting party,
- determining one or more contracting parties corresponding to the product, and
- sending a plurality of acceptable terms to the one or more contracting parties, the plurality of acceptable terms based on the plurality of parameters indicated by the second contracting party.

\* \* \* \* \*